United States Patent
Clarke et al.

[15] 3,691,123

[45] Sept. 12, 1972

[54] POLYMER DISPERSIONS

[72] Inventors: Michael Raymond Clarke, Montreal, Canada; Desmond Wilfrid John Osmond, Windsor; Frederick Andrew Waite, Farnham Common, both of England

[73] Assignees: Imperial Chemical Industries Limited, Imperial Chemical House, Millbank, London, England; Balm Paints Limited, Melbourne, Australia

[22] Filed: Dec. 19, 1969

[21] Appl. No.: 886,777

Related U.S. Application Data

[63] Continuation-in-part of Ser. No. 525,315, Feb. 7, 1966, abandoned, and a continuation-in-part of Ser. No. 653,631, July 17, 1967, abandoned.

[30] Foreign Application Priority Data

Feb. 12, 1965 Great Britain............6,289/65
July 20, 1966 Great Britain..........32,626/66

[52] U.S. Cl......260/29.1 R, 260/31.2 R, 260/32.8 R, 260/33.2 R, 260/33.4 R, 260/33.6 A, 260/33.6 PQ, 260/33.6 UA, 260/33.6 R, 260/34.2

[51] Int. Cl.............................................C08f 45/28

[58] Field of Search........260/29.1 R, 31.2 R, 33.6 R, 260/33.6 A, 33.6 UA, 34.2, 823, 875, 876 R, 31.8 R, 33.2 R

[56] References Cited

UNITED STATES PATENTS

| | | | |
|---|---|---|---|
| 2,820,019 | 1/1958 | Eustance | 260/34.2 |
| 3,218,287 | 11/1965 | Schmidle et al. | 260/33.6 |
| 3,232,903 | 2/1966 | Schmidle et al. | 260/33.6 |
| 3,255,135 | 6/1966 | Schmidle et al. | 260/33.6 |
| 3,304,276 | 2/1967 | Nielsen et al. | 260/34.2 |
| 3,397,166 | 8/1968 | Schmidle et al. | 260/33.6 |

*Primary Examiner*—Lewis T. Jacobs
*Assistant Examiner*—H. H. Fletcher
*Attorney*—Cushman, Darby & Cushman

[57] ABSTRACT

Stable dispersions of particles of synthetic polymer in inert organic liquid in which the polymer is insoluble, the dispersion containing a stabilizer which is soluble in the organic liquid and which provides around the polymer particles a stabilizing steric barrier at least 12 A thick, the stabilizer being bonded to the polymer particles by strong specific interaction between polar groups in the stabilizer and complementary polar groups in the disperse polymer.

12 Claims, No Drawings

POLYMER DISPERSIONS

This is a continuation-in-part of prior U.S. applications, Ser. Nos. 525,315 and 653,631, filed respectively on Feb. 7, 1966 and July 17, 1967, both now abandoned.

This invention relates to dispersions of polymer particles in organic liquids, to processes of making such dispersions and to stabilizers for use in such dispersions.

It has been proposed to stabilize a dispersion of polymer particles in an organic liquid in which the polymer is insoluble by means of a block or graft copolymer containing two types of polymeric component of which one type is solvated by the organic liquid and another type, of different to of the first type, is relatively non-solvated but is associated with the polymer particles. The association of the relatively non-solvated polymeric component with the particles thereby provides around the particles a layer of the stabilizer, the solvated polymeric components of which extend outwardly from the surface of the particles and provide a solvated barrier which sterically stabilizes the particles in disperse form.

Whilst the use of such stabilizers resulted in very much improved polymer dispersions of particular value in coating compositions there were certain limitations on the nature of the block or graft copolymers which could be used as stabilizers. Firstly, they had to contain a constituent which, like the disperse polymer, was relatively non-solvated by the organic liquid and preferably was of a similar chemical structure, Secondly, in order to generate an adequate associative force, the non-solvated component had to be massive, i.e., it had to be polymeric. The solvated component was also polymeric and preferably its mass was of the same order as that of the non-solvated polymeric component of the stabilizer.

We have now found that in organic liquids these mass-dependent associative forces between stabilizer and disperse polymer may be supplemented by or even replaced by strong forces generated between certain types of polar groups.

We now provide stable dispersions of particles of synthetic polymer in inert organic liquid in which the polymer is insoluble, the dispersion containing a stabilizer which is soluble in the organic liquid and which provides around the polymer particles a stabilizing steric barrier at least 12 Å thick, the stabilizer being bonded to the polymer particles by strong specific interaction between polar groups in the stabilizer and complementary polar groups in the disperse polymer.

The stable dispersions of particles of synthetic polymer in inert organic liquid in which the polymer is insoluble may be made by dispersing particles of the polymer in the liquid in the presence in solution in the liquid of a stabilizer containing polar groups, the disperse polymer being one containing polar groups capable of entering into strong specific interaction with polar groups in the stabilizer so as to cause the stabilizer to be bonded to the polymer particles and provide around them a stabilizing steric barrier at least 12 Å thick.

Particles of polymer having suitable polar groups may be made by bulk polymerization of suitable monomers followed by comminution of the polymer, e.g., by grinding, or by solution polymerization followed by precipitation. Preferably, in order to improve the rheology of the final dispersion, the particles so-produced are rendered approximately spherical by heat treatment in a gaseous medium, for example, flame spraying.

Alternatively, suitable polymer particles may be produced by aqueous emulsion polymerization. In addition to the possibility of incorporating suitable polar groups in the polymer particles by polymerization of an appropriate monomer or co-monomer, as described later in this patent specification, use may be made of the fact that in most cases polymer particles prepared by aqueous emulsion polymerization will have suitable polar groups stably attached thereto. These may arise from the use in the polymerization of an ionic stabilizer for the emulsion which becomes stably attached to the particles as a result of the stabilizer becoming involved in chain transfer reaction with the monomer during the course of the polymerization.

We also provide a process of making stable dispersions of particles of synthetic polymer in inert organic liquid in which the polymer is insoluble by forming the particles in the liquid in the presence in solution in the liquid of a polymeric stabilizer containing polar groups, the disperse polymer being one containing polar groups provided by a monomer capable of entering into strong specific interaction with polar groups in the stabilizer so as to cause the stabilizer to be bonded to the polymer particles and provide around them a stabilizing steric barrier at least 12 Å thick.

The particles may be formed by precipitating the polymer in the liquid from solution, for example, by mixing a non-solvent with a solution of the polymer in a solvent or by evaporating solvent from a solution of the polymer in a mixture of solvent and non-solvent.

Preferably, however, the particles are produced by polymerizing monomer in the organic liquid to produce the polymer which, being insoluble in the liquid, forms disperse particles which become stabilized by the stabilizer.

We also provide, therefore, a method of making stable dispersions of particles of synthetic polymer in inert organic liquid in which the polymer is insoluble by polymerizing monomer in the organic liquid in the presence in solution in the organic liquid of a polymeric stabilizer containing polar groups, at least part of the monomer being one providing polar groups capable of entering into strong specific interaction with polar groups in the stabilizer to bond it to polymer particles produced by the polymerization and so provide around the particles a stabilizing steric barrier at least 12 Å thick.

By inert organic liquid we mean one which does not inhibit the specific interaction between the stabilizer and disperse polymer; also if the disperse polymer is produced by polymerization of monomer in the liquid the liquid is inert with respect to the polymerization reaction.

By strong specific interaction we mean that the bond energy between the pairs of interacting polar groups should be at least about that corresponding to the bond energy between ester carbonyl groups interacting with nitrile groups in an aliphatic hydrocarbon liquid.

Where the bond energy is about this level or slightly higher, say that of ester carbonyl groups interacting with aliphatic hydroxyl or carboxyl groups in an aliphatic hydrocarbon liquid the stabilizer molecule should contain on average at least 50 polar groups and preferably at least 100 polar groups in order to ensure that sufficient groups interact with complementary groups in the disperse polymer to provide the necessary stabilizer bond energy. In this embodiment of the invention the polymeric chain itself of the stabilizer provides the steric barrier in the form of random extended trails or coils or loops solvated by the organic liquid of the dispersion, the tails, coils or loops being attached at one or both ends to the polymer particle by specific interaction of polar groups. Not all the polar groups in the stabilizer will be interacted in this configuration; a major proportion will be located in the extended tails, coils or loops out of contact with the polymer particle. The thickness of the steric barrier is determined by the effective pendent length of such tails, coils or loops. As stated above the barrier must be at least 12 A thick and in practice in this configuration it is usually not less than 30 A thick because of the polymeric nature of the stabilizer, this degree of thickness being provided by the solvated tails, coils and loops.

The higher the bond energy of the polar groups the higher is the proportion interacted with the polymer and further, each bond makes a larger contribution to the total stabilizer bonding energy. In consequence as the bond energy is increased the stabilizer can contain fewer polar groups per molecule and with a bond energy level of about that corresponding to the interaction of nitrile with nitrile or of alkyl hydrogen phosphate with amine in aliphatic hydrocarbon the stabilizer may contain on average as few as 10 but preferably not less than 20 polar groups per molecule, most of which will be interacted with the polymer surface. Where, therefore, the steric barrier is to be provided by tails, coils or loops of the polymeric chain itself of the stabilizer the trails, coils or loops will usually be relatively free of strongly acting polar groups. In general, using stabilizers of this type and in this configuration two polar groups should serve to anchor at least 50 A of solvated chain, i.e., on average the stabilizer polymer chain should provide at least 50 A of solvated chain between polar groups, this length corresponding to a minimum molecular weight of approaching 1,000.

With even stronger bond energy, say above about that corresponding to the interaction of mono- or dialkyl phosphate groups with amine groups in aliphatic hydrocarbon, the stabilizer can contain even fewer groups, usually from 1-10 being suitable though in some circumstances the use of stabilizers containing more than a few polar groups can lead to thickening of the dispersion. Again, it is the solvated tails, coils and loops provided by the polymeric chain itself of the stabilizer which provides the steric barrier and again in practice the barrier is usually not less than about 30 A, being provided by a polymer chain of molecular weight not less than several thousand.

The prime requirement in all cases is that the stabilizer as a whole be soluble in the organic liquid of the dispersion and consequently it must consist at least in part of chain-like segments or components which are solvated by the liquid. These solvated segments or components, being in an extended configuration in the liquid, provide the solvated steric barrier around the polymer particles.

The degree to which a chain-like segment or component is solvated by any particular organic liquid depends on the polarity of the segment or component relative to that of the liquid and its polarity in turn depends on the nature of the links of the chain itself and of the atoms or groups attached thereto. If the segment or component and liquid are of similar polarities then in general the segment or component will be solvated by the liquid and will be freely extended in the liquid; in such a liquid, stabilizer associated with insoluble polymer particles can provide a stabilizing steric barrier of solvated segments or components. If they were of dis-similar polarity relative to the liquid then the segments or components would be relatively non-solvated, if solvated at all, and would be in a collapsed or coiled state in which they could not provide a steric barrier adequate to prevent flocculation of the particles. The choice of the chain-like segment or component is, therefore, determined by the nature of the organic liquid in which the polymer is dispersed. For example, where the organic liquid of the dispersion is non-polar, e.g., an aliphatic or aromatic hydrocarbon, the chain-like segment or component should also be non-polar and where the organic liquid is polar, e.g., a ketone, ester or ether, the chain-like segment or component should also be similarly polar.

The nature of the organic liquid is in turn related to the nature of the polymer to be dispersed therein since the liquid must be a non-solvent for the polymer. This, in general, implies that the organic liquid must be of different polarity to that of the polymer though some polymers which have a highly crystalline structure are insoluble in most organic liquids irrespective of polarity.

The polar and complementary polar groups may be acidic and basic groups, the bond between the stabilizer and disperse particles being the result of protolytic reaction between the two groups. The terms "acidic groups" and "basic groups" are as defined by Bronsted and Lowry, i.e., an acidic group is a species having a tendency to lose a proton and a basic group is a species having a tendency to add on a proton. The protolytic reaction between the two types of groups gives rise to specific associative forces between the stabilizer and the polymer particles. Such protolytic reactions include those commonly referred to as hydrogen bonding.

In the stronger protolytic reactions, the bond energy is the result of specific interaction between separate fixed charges, one in one polar group and another in the complementary polar group. In another embodiment of this invention similar specific interactions arise between a pair of opposite charges, i.e., a dipole, in one polar group and a pair of opposite charges, i.e., a dipole, in the complementary polar group.

Where the reaction between stabilizer and disperse polymer is protolytic suitable types of acidic polar groups include $-COOH$, $-SO_3H$. $-SO_4H$, $-PO_4H_2$, $=PO_4H$ and $-PO_3H_2$. The basic polar groups will be essentially of the type found in organic bases, e.g.

where $R_1$ and $R_2$ may be aryl, aralkyl, alkyl, cycloalkyl or hydrogen or, together, may form a ring structure which optionally may contain a hetero-atom and optionally may be saturated or unsaturated. Such basic groups include dimethyl amino, di-isopropyl amino, dihexyl amino, morpholino, piperidino, N-methylbenzyl amino and N-methyl phenyl amino. Other types of basic groups are those occurring in quaternary ammonium bases, substituted guanidine, substituted dicyandiamide, and substituted pyridine.

Where the interaction between the stabilizer and disperse polymer is between dipoles suitable dipolar groups include those present in nitrile, sulphone, nitro and ether oxygen groups, cyclic anhydrides and phosphate and sulphonate esters, and ion pairs existing in salts, e.g., phosphate and sulphonate salts, metal soaps of a fatty acid and metal soaps or quaternary ammonium salts of sulphated or phosphated fatty alcohol or Zwitter ions.

The bond energies of pairs of interacting polar groups will depend not only on the specific nature of the polar groups but also on the nature of the liquid in which the interaction takes place. The following is a list of representative systems arranged approximately in increasing order of bond energies determined as heats of reaction per mol group pair by the method later described.

| Interacting polar groups: | | Medium: |
|---|---|---|
| ester carbonyl | nitrile | aliphatic hydrocarbon |
| ester carbonyl | carboxylic acid | aromatic hydrocarbon |
| ester carbonyl | aliphatic hydroxyl | aromatic hydrocarbon |
| nitrile | nitrile | aromatic hydrocarbon |
| ester carbonyl | carboxylic acid | aliphatic hydrocarbon |
| ester carbonyl | aliphatic hydroxyl | aliphatic hydrocarbon |
| carboxylic acid | carboxylic acid | ester |
| aliphatic hydroxyl | aliphatic hydroxyl | ester |
| carboxylic acid | carboxylic acid | aromatic hydrocarbon |
| carboxylic acid | amine | ester |
| aliphatic hydroxyl | aliphatic hydroxyl | aromatic hydrocarbon |
| alkyl hydrogen phosphate | amine | ester |
| nitrile | nitrile | aliphatic hydrocarbon |
| carboxylic acid | carboxylic acid | aliphatic hydrocarbon |
| carboxylic acid | amine | aromatic hydrocarbon |
| carboxylic acid | aliphatic hydroxyl | aliphatic hydrocarbon |
| aliphatic hydroxyl | aliphatic hydroxyl | aliphatic hydrocarbon |
| alkyl hydrogen phosphate | amine | aromatic hydrocarbon |
| carboxylic acid | " | aliphatic hydrocarbon |
| alkyl hydrogen phosphate | " | aliphatic hydrocarbon |
| sulphonic acid | " | ester |
| alkyl hydrogen sulphate | " | ester |
| sulphonic acid | " | aromatic hydrocarbon |
| alkyl hydrogen sulphate | " | aromatic hydrocarbon |
| sulphonic acid | " | aliphatic hydrocarbon |
| alkyl hydrogen sulphate | " | aliphatic hydrocarbon |

An indication of the strength of the associative force available in the interaction between stabilizer and disperse polymer is given by the effective molar heat of interaction of the group in the stabilizer with the group to be used in the polymer particles. This is determined under the reaction conditions in which the dispersion is to be formed, the stabilizer being dissolved in the liquid and being interacted with a soluble compound containing the group to be used in the disperse polymer. Where the group to be used in the disperse polymer shows significant self-association or association with the liquid of the dispersion the value as determined above should be corrected for this by determining in a blank experiment the apparent heat of interaction (which may be negative) under the same conditions but in the absence of the stabilizer and subtracting this from the first determined value.

The soluble compound should be such that the polar group under test is, with respect to neighboring groups in the molecule, in an environment as similar as possible to that in the disperse polymer. For example, where the polar group is to be present in a disperse polymer made by addition polymerization, a suitable soluble compound for use in the above test would be the product of hydrogenating the double bond in the monomer to be used in the addition polymerization. Similarly, where the disperse polymer is to be made by condensation polymerization, a suitable soluble compound would be the product of reacting with a simple molecule the condensation reactive groups of the appropriate monomer or comer used in the condensation polymerization reaction; for example, a diol containing the polar group could be esterified with acetic acid.

The minimum bond energy useful in the interactions involved in this invention is about that represented by the first system given in the above list and when determined by the above test this provides a bond energy of about 0.5 kilo calorie per mole group pair. Preferably, however, the bond energy should be at least about 1.0 kilo calorie per mole group pair, this being provided, for example, by interaction of ester carbonyl groups with carboxylic acid in aliphatic hydrocarbon.

As is apparent from the above list, the energy of interaction of a particular pair of polar groups is dependent on the nature of the liquid in which the groups are interacted. In general, as the polarity of the liquid increases, the bond energy decreases and so, as stated above, the liquid of the dispersion must not be so polar as to inhibit the interaction and so prevent bonding of the stabilizer to the disperse particles.

Although, because of the practical difficulties inherent in calorimetry, the above list simply sets out various representative systems in an approximate relative order of bond energies without reference to absolute values as determined in any one particular laboratory, any system not specifically mentioned in the list can readily be tested and compared with the listed systems by the method described above.

The specific associative force resulting from the interaction between the polar groups in the stabilizer and disperse polymer may be, and usually is, solely or largely responsible for the association between stabilizer and disperse polymer, but in some particular types of stabilizer structure, e.g., those in which relatively non-solvated segments are located along a polymeric backbone, the relatively non-solvated segments may provide a supplementary mass-dependent associative force of the type described with reference to the prior art.

The disperse polymers may be derived from ethylenically unsaturated monomers. Moderately polar polymers are, e.g., those derived from, as the major monomer, esters of unsaturated acid with lower alcohol, e.g., acrylic, methacrylic, ethacrylic and itaconic acid esters of methyl, ethyl and butyl alcohol. Higher esters such as octyl and lauryl give less polar polymers but this can be balanced by copolymerization with monomer containing highly polar groups, e.g., acrylic, methacrylic, itaconic, maleic, fumaric and crotonic acids. Similar moderately polar polymer is produced from, as major monomer, an ester or ether of an unsaturated lower alcohol, e.g., vinyl alcohol. The esters may be of hydrofluoric acid and lower acids, e.g., acetic, chloracetic, propionic and formic. Where higher acids are used they may be dicarboxylic acid, such as oxalic, the second carboxylic group being left free or a proportion being esterified with a lower alcohol, e.g., methyl or ethyl alcohol. The unsaturated ethers may be simple ethers of a lower 1–4 C alkanol, e.g., methyl ethyl, propyl and butyl vinyl ethers.

Less polar polymers are produced from higher esters of unsaturated acids or alcohols, e.g., lauryl methacrylate or vinyl stearate, or from unsaturated hydrocarbons such as vinyl benzenes and isoprene.

More highly polar polymers may be made by polymerization or copolymerization of highly polar monomers such as the above-mentioned unsaturated acids themselves of their polar derivatives such as acid chlorides, amides or methylolamides.

Polymers which are crystalline and, therefore, insoluble, in the organic liquids to be used in accordance with this invention are those of vinyl chloride, vinylidene chloride, acrylonitrile, methacrylonitrile, ethylene and propylene (stereo-regular polymer).

Where the interaction between the stabilizer and the disperse polymer is a protolytic one the disperse polymer may contain either the acidic group or the basic group and though the polymer may be a homopolymer of a monomer containing such a group, the group is more conveniently incorporated in smaller proportions by copolymerization of a suitable proportion of a co-monomer containing the group. The groups must be present in the disperse polymer in a proportion providing sufficient reactive sites for attachment of the stabilizer and, though the minimum required will vary with the nature of the stabilizer and possibly with the nature of the major co-monomer, in practice usually not more than 25 percent by weight of co-monomer incorporating the reactive group is required, from 0.5–5% by weight of the co-monomer being preferred.

Suitable co-monomers for introducing acidic reaction groups for association with the stabilizer include, in addition to the above-mentioned monomers containing a carboxyl group, those containing a sulphonic group, e.g., vinyl sulphonic acid and styrene sulphonic acid, and those containing a phosphate group such as vinyl phosphate and phosphonic esters of unsaturated OH-containing compounds such as the phosphonic ester of hydroxy isopropyl methacrylate. Suitable co-monomers for introducing basic reaction groups include vinyl pyridine, vinyl dimethylamine, N,N-dimethylaminoethyl methacrylate and tertiary butylamino ethyl (meth)acrylate.

As in the case of the other polar groups the dipolar groups are also conveniently introduced into the disperse polymer by a suitable co-monomer and in some cases the disperse polymer may consist essentially of a polymerized monomer containing a dipolar group. Suitable co-monomers include acrylonitrile, acrylamide, maleic anhydride, vinyl methyl sulphone, methyl ester of vinyl sulphonic acid, dimethyl ester of vinyl phosphonic acid, dimethyl ester of vinyl phosphate, para-nitro benzoic acid ester of vinyl alcohol. In some cases the disperse polymer may be a homo-polymer of a dipole-containing monomer such as acrylonitrile Polymers prepared by condensation polymerization generally contain dipolar groups and/or terminal polar groups as a result of the condensation reactions and these can be made use of in the bonding of stabilizer to disperse particles of such polymers. However, where the dispersion is prepared by polymerization of monomers or comers in the presence of stabilizer, it is not usually possible to make use of protolytic interactions to provide the stabilizer bonding energy because of the likelyhood of the polar groups in the stabilizer becoming involved in the condensation reaction. In these circumstances dipole interactions should be used to attach stabilizer to the polymer particles as they are formed. For example, a dispersion of a condensation polymer may be made by reacting hexamethylene diamine with an equimolar proportion of adipoyl chloride in a mixture of aliphatic and aromatic hydrocarbons in the presence of a stabilizing random copolymer of octa-decyl methacrylate and acrylonitrile (molar ratio 1:1, molecular weight about 20,000). In this case the stabilizer is bonded to the disperse particles by interaction between nitrile groups in the stabilizer and amide groups in the disperse polymer.

A dispersion of a polyester may be obtained by reacting terephthaloyl chloride and ethylene glycol in an aromatic hydrocarbon in the presence of a stabilizing random copolymer of octadecyl methacrylate and dimethylaminoethyl methacrylate (molar ratio 1:1, molecular weight about 35,000) which has been converted to a sulpho-betaine derivative by reaction with propane sultone. In this case the stabilizer is bonded by interaction between the sulphobetaine Zwitter ions in the stabilizer and the ester carbonyl groups in the disperse polymer.

In general, conventional catalysts, initiators, chain transfer reagents, etc. may be used in the polymerization processes. In the case of addition polymerizations free radical initiators such as organic peroxides, hydroperoxides and bis-nitriles, or ionic initiators such as Ziegler catalysts may be used (provided the polar groups in the stabilizer or disperse polymer do not inhibit the action of the ionic initiator). In the case of condensation polymerizations, fast non-equilibrium reactions are preferred, e.g., the reaction of acid chlorides with amino or hydroxyl compounds in the presence of suitable acid acceptor or the self-polymerization of lactones, lactams or cyclic ethers.

Dispersions may be made by forming the disperse particles of polymer in the organic liquid in the presence of the stabilizer. Preferably the particles are formed by polymerizing monomer or comers in the organic liquid to produce the polymer which, being insoluble in the liquid, forms disperse particles which become stabilized by the stabilizer.

In dispersion polymerizations the monomer and any co-monomer needed to provide the polar group in the disperse polymer and/or stabilizer may all be added at the beginning of the reaction or portions may be added at intervals or continuously during the reaction.

The amount of monomer or comer to be polymerized in the organic liquid will depend on the desired polymer content of the final dispersion.

Alternatively, the polymers may be made by bulk polymerization followed by comminution of the polymer and dispersion in the organic liquid.

As a further alternative, suitable polymer particles may be produced by aqueous emulsion polymerization. In such polymerizations, apart from the possibility of incorporating suitable polar groups in the polymer particles by polymerization of an appropriate monomer or co-monomer, as described in this patent specification, use may be made of the fact that in most cases polymer particles prepared by aqueous emulsion polymerization will have suitable polar groups stably attached thereto. These may arise from the use in the polymerization of an ionic stabilizer for the emulsion which becomes stably attached to the particles as a result of the stabilizer becoming involved in chain transfer reaction with the monomer during the course of the polymerization, e.g., salts of sulphonic acid derived from sales of alkyl aryl sulphonic acids or of sulphate half-esters derived from salts of alkyl sulphates or of partial esters of phosphoric acid derived from salts of partial alkyl phosphates or of carboxylic acid derived from salts of long chain fatty acids, or of bases derived from salts of long chain bases or of quaternary bases derived from alkyl pyridinium salts.

For example, salts of sulphonated castor oil (sold as Calsolene oil and Turkey Red Oil), salts of oleyl acid phosphate and similar surfactants used as stabilizers in emulsion polymerizations will have polymer chains grafted thereon during the course of the polymerization and so will become part of the resulting polymer particles. The salts themselves may be used as the polar group in the specific interaction or they may first be converted to the free acid or base and used as such.

Alternatively, an emulsion stabilizer containing polar groups can be stably attached to the particles during the aqueous emulsion polymerization by using one which contains unsaturated groups which will copolymerize with the monomer, e.g., salts of copolymerizable unsaturated acids or bases as salts of vinyl sulphonic acid, (meth)acrylic acid, crotonic acid and maleic and maleic half-ester or salts of tertiary or quaternary unsaturated bases such as vinyl pyridine and dialkyl aminoalkyl (meth)acrylates.

As a further alternative, use may be made of polar groups in the disperse polymer particles derived from the initiator used in the aqueous emulsion polymerization. This source of polar groups is particularly useful where the monomer being polymerized does not readily chain transfer. In these cases most of the polymer chains in the particles will contain such polar groups, e.g., sulphate from ammonium or potassium persulphate initiator and carboxyl from 4,4-azobiscyanovaleric acid initiator.

In other cases where the polymer particles have no suitable polar groups stably attached thereto, whether obtained by comminution or precipitation of polymer or by aqueous emulsion polymerization, suitable polar groups may be attached to the disperse particles in an aqueous phase, e.g., by sulphation of hydroxyl groups or sulphonation of aryl polymer chains in the surface of the polymer particles or in, say, a non-ionic stabilizer which has become attached to the particles as a result of chain transfer during an aqueous emulsion polymerization.

In the case of association involving acidic and basic groups, where the protolytic reaction is strong as represented by the reaction between an acid phosphate group and an amine group in aliphatic hydrocarbon, one acidic or basic group per stabilizer molecule may be adequate to provide the necessary associative force. In the case of weaker protolytic reactions, as represented by interaction between a carboxylic group and an mine group in aliphatic hydrocarbon, it will be necessary to incorporate more than one acidic or basic group in the stabilizer molecule in order to provide the necessary associative bond between stabilizer and particle. Similar considerations apply in the case of dipole association. However, when the stabilizer contains more than one polar group it is not always the case that on reaction with the disperse particle the resultant associative force is the total of the associative force developed by the groups separately. The most effective groups from the point of view of bond strength are those which are not subjected to interference from adjacent like groups and which are orientable for reaction with a complementary group in the polymer particle. Consequently, where a multiplicity of reactive groups is present in a stabilizer molecule these should, as far as possible, be so spaced in the molecular structure as to avoid mutual interference.

For example, the stabilizer may consist essentially of a solvated homopolymer or random or ordered copolymer chain along which the polar groups are spaced. The polymer chain may be branched in which case the polar groups may be spaced along a solvated terminal cross-branch or side branch provided that the main chain extends the necessary minimum length from such branch to provide the solvated steric barrier.

In another alternative embodiment the stabilizer may consist essentially of a segmented polymer. Subject to the limitation that the stabilizer as a whole must be soluble in the organic liquid of the dispersion, one or more of the segments may be relatively non-solvated, these segments alternating or being distributed along solvated segments.

In a preferred form of the invention the stabilizer structure is one in which a plurality of pendent solvated chain-like components are attached to a polymeric backbone which has distributed along it a plurality of polar groups for interaction with the disperse polymer. The polar groups may form part of the backbone or may be attached to it. An advantage of this structure is that where the polar groups are such that they provide with complementary polar groups in the polymer bond energies of from about that corresponding to the interaction of nitrile group with nitrile group in aliphatic hydrocarbon to about that corresponding to the interaction of alkyl hydrogen phosphate with amine in aliphatic hydrocarbon and are distributed along the backbone at an average spacing of not more than about 10 covalent (or equivalent) links, the configuration of the preferred structure is such that it is essentially the solvated segments pendent from the backbone which provide the stabilizing solvated steric barrier and, therefore, can have a moleculecular length as short as 12 A. In an extended condition, and this is desirably the condition of the solvated chain-like component of the stabilizer when in use, a length of 12 A is equivalent to a chain of about 12 covalent links. Preferably the solvated chain-like component is at least 16 A in length which is equivalent to about 16 covalent links. The solvated chain-like components attached to the backbone can be of molecular weight up to 1,000 and, particularly in those cases where the backbone is relatively solvated, the molecular weight can be higher. The chain-like components attached to the backbone are not necessarily all of the same length. The suitable spacing of the solvated components along the backbone will depend on their length. In general, the spacing of the solvated components should be of the order of their root mean square dimension, preferably from half to twice this dimension. For example, where the solvated components are $C_{12} - C_{15}$ hydrocarbon chains, and so in a hydrocarbon liquid have an extended length of about 12–15 A, these would have root mean square dimensions of about 6 A and so should be distributed along the backbone at an average spacing of about 4–6 links; i.e., where the backbone is prepared by addition polymerization the frequency of the solvated chains on average will be one per 2 or 3 monomer units forming the backbone.

Similarly, where the solvated components are condensation products of 12-hydroxy stearic acid and stearic acid in a mole ratio of 2:1 respectively and have a molecular weight of about 1,000, their extended length will be about 50 A and their effective root mean square dimension will be about 20 A. They should, therefore, be distributed along the backbone at an average spacing of about 20 A, i.e., where the backbone is prepared by addition polymerization at about an average spacing of one solvated component per 10 monomer units.

A preferred stabilizer of this type is one having at least 10 solvated components of average molecular weight not more than 1,000 attached to a backbone carrying at least 10 polar groups, the number of solvated components to polar groups being in a proportion of from 1:3 to 3:1.

The polar groups and solvated components are usually separated entities, the solvated components being attached to the backbone and the polar groups being carried in or on the backbone. However, in some cases the polar groups and solvated components may be attached one to the other. For example, the solvated components may be attached to the backbone by ionic linkages which also provide a dipole for specific interaction with the disperse polymer.

In general, the embodiment using a stabilizer comprising a backbone carrying a plurality of polar groups and of solvated components is preferred because of its greater efficiency. Efficiency can be further improved by using the shorter solvated components when the polymer is finely dispersed, e.g., in particle sizes of less than $0.1-1.0\mu$ and the longer solvated components when the polymer particles are larger, e.g., of size greater than $0.1-1.0\mu$, and a thicker steric barrier is required to prevent flocculation of the particles.

In this embodiment of the invention the nature of the backbone itself is not narrowly critical, its primary function being to provide a supporting structure for the chain-like components and polar groups. The important factor is that it must not contain atoms or have attached to it groups or substituents which, despite the presence of the solvated chain-like components along the backbone, cause the backbone to be in a collapsed or closely coiled state in the organic liquid of the dispersion. The frequency of the distribution of the solvated chains along the backbone ensures that even if the backbone itself is relatively non-solvated by the organic liquid of the dispersion, the steric reaction between the solvated chains attached thereto tends to maintain the backbone in a sufficiently extended condition to reduce substantially interference between the polar groups attached thereto. The preferred stabilizer structure is one in which the polar groups are freely able to orientate. The preferred conditions for multiple interaction of polar groups would not be met, for example, in a block or graft copolymer stabilizer of the prior art in which a solvated polymeric component is attached to a relatively non-solvated polymeric component associated with the polymer particles; in this case the associated polymeric component, being relatively non-solvated by the organic liquid of the dispersion, is in a collapsed or coiled condition and any polar groups on this polymeric component would be in fixed relative orientation in close proximity to each other. This would result in mutual interference between the groups and most of them would be deprived of the opportunity of interacting with complementary groups in the disperse polymer.

Since the liquid of the dispersion is organic the backbone is preferably an organic polymer chain though if suitably modified by organic groups attached thereto, inorganic polymer chains may be used. Thus the chain, which may be linear or branched, may consist of carbon atoms alone or carbon atoms linked with one or more hetero atoms, in particular oxygen, nitrogen, sulphur, phosphorus, silicon and boron; alternatively, it may consist of a series of pairs of P—O groups, Si—O groups, Ti—O groups, or B—O groups. It may be formed by addition polymerization or by condensation reactions or by specific polar interaction.

As stated above, the prime requirements in all cases are that the stabilizer as a whole be soluble in the inert liquid, and consequently it must consist at least in part of chain-like segments or components which are solvated by the liquid, and that it contains polar groups in a configuration in which they can interact with complementary polar groups in the disperse polymer.

Where the organic liquid of the dispersion is mainly aliphatic hydrocarbon in nature, e.g., pentane, hexane, heptane, and octane, the following are examples of suitable chain-like components which would be solvated by the liquid:

long paraffinic chains such as occur in stearic acid, self polyesters of —OH fatty acids such as 12-OH stearic acid or the polyesters occurring in carnauba wax, polyesters of di-acids with diols, e.g., polyesters of sebacic acid with 1,12dodecane diol or of adipic acid with neo-pentyl glycol;

polymers of long chain esters of acrylic or methacrylic acid, e.g., stearyl, lauryl, octyl, 2-ethyl hexyl and hexyl esters of acrylic or methacrylic acid;

polymeric vinyl esters;

polymers of butadiene and isoprene and non-crystalline polymers of ethylene and propylene.

The organic liquid may, of course, be a commercially available hydrocarbon mixture, such as mineral spirits and white spirit, which also are suitable. Where the organic liquid is mainly aromatic hydrocarbon in nature, e.g., xylene and xylene mixtures, benzene, toluene and other alkyl benzenes and solvent naphthas, similar solvatable components may be used and, in addition, shorter chain analogues, e.g., polymers of ethoxy ethyl methacrylate, methyl methacrylate and ethyl acrylate. Other components suitable for use in this type of organic liquid include:

aromatic polyesters, e.g., non-drying oil-modified alkyd resins;

aromatic polyethers;

aromatic polycarbonates; and polymers of styrene and vinyl toluene.

Where the organic liquid is weakly polar in nature, e.g., a higher alcohol, ketone or ester, suitable solvatable components include:

aliphatic polyethers;

polyesters of short chain acids and alcohols;

polymers of acrylic or methacrylic esters of short chain alcohols.

Bearing in mind that the organic liquid must be inert, it may also be selected from liquids of greater polarity, e.g., a lower alcohol, ketone or ester. Where the interaction between stabilizer and disperse polymer is protolytic the liquid should be one which is not substantially involved in the reaction and preferably it is an aprotic liquid. Where the interaction is between dipoles, the dipole moment of groups in the organic liquid should be low compared with the dipole moment of the groups involved in the stabilizer/disperse polymer interaction.

Where the liquid is polar the chain-like component to be solvated should also be polar, but again, bearing in mind the fact that it will contain polar groups, it also should be selected with a view to avoiding serious interference by these polar groups with the stabilizer/disperse polymer interaction. The most suitable polar components are those containing in their molecule a large number of weakly polar groups, e.g., poly(lower alkyl ether), poly(lower alkyl vinyl ether), polyvinyl alcohol, poly(hydroxy alkyl methacrylates), poly(acrylic esters of glycol mono-alkyl ethers), and cellulosic ethers and esters.

Stabilizers containing one solvatable polymeric chain-like component and one strongly reactive polar group may be produced, for example, by the process of U.S. Pat. No. 3,390,206 in which, say, polylauryl methacrylate having a terminal carboxyl group is made by polymerizing the monomer in the presence of $\gamma,\gamma'$-azobis($\gamma$-cyanovaleric acid) and thioglycollic acid. The carboxyl group may be converted to the corresponding acid chloride and this in turn may be reacted with an amino sulphonic acid such as meta- or para-amino benzene sulphonic acid, amino naphthalene sulphonic acid, or N-methyl taurine. Alternatively, a corresponding hydroxyl-terminated polymer chain may be sulphated to produce a terminal acidic group. A similar stabilizer with a terminal acidic group may be produced, for example, by polymerizing dodecyl methacrylate as a dispersion in water using a persulphate salt as initiator, the dispersion then being acidified with sulphuric acid to coagulate the disperse polymer and convert the sulphate end groups to free acid groups.

Further, the process of the above-mentioned Patent may be used to prepare polymer chains terminated by basic groups, e.g. by polymerizing the monomer in the presence of $\alpha,\alpha'$-azobis($\gamma$-amino-$\alpha,\gamma$-dimethyl valeronitrile) and $\beta$-mercapto ethylamine hydrochloride.

Stabilizers may also be produced by random copolymerization of a main monomer which will provide the chain-like component with a minor proportion of a monomer containing the desired reactive group. By suitable adjustment of molecular weight and co-monomer proportions, stabilizer containing statistically one or, at will, more reactive group per molecule can be produced. Suitable main monomers for production of solvatable polymers are exemplified above. Co-monomers which will provide acidic or basic polar groups are, in general, similar to those usable as described above for introduction of those polar groups into disperse polymer made by addition polymerization. For example, co-monomers which will provide basic reactive groups include dimethyl aminoethyl methacrylate, 4-vinyl pyridine and t-butyl aminoethyl acrylate, using, say, azodiisobutyronitrile as initiator. The polymerization may also be carried out in the presence of a chain transfer reagent such as octyl mercaptan. Acidic groups may be introduced using appropriate co-monomer.

Another method is to use as co-monomer one containing a group which can be reacted with another compound to introduce the desired acidic or basic polar group. For example, one can use a co-monomer containing an epoxide group, e.g., glycidyl methacrylate, and then esterify the epoxide groups with an amino acid, e.g. meta- or para-amino benzoic acid or w-amino caproic acid. Alternatively, one can use a co-monomer containing an acidic group, e.g., acrylic or methacrylic acid, or a derivative such as an acid chloride group, these groups then being reacted with an amino compound such as N,N-dimethyl amino ethanol or N',N'-dimethyl ethylene diamine. Corresponding stabilizers containing one or more acidic polar groups per molecule can be produced in analogous ways by selection of an appropriate co-monomer. For example, copolymers containing one or more hydroxyl groups may be sulphated with oleum, or copolymers containing one or more epoxide groups may be treated with phosphoric acid or mono-hydrate sulphuric acid to introduce the acidic reactive polar group. As a further alternative a copolymer containing acid anhydride groups, e.g., a vinyl toluene/maleic anhydride copolymer may be reacted with an amino sulphonic acid or a copolymer containing one or more benzene groups, e.g., a dodecyl methacrylate/styrene copolymer may be sulphonated to provide acidic reactive groups.

Similar general considerations apply to the preparation of stabilizers in which the polar group is a dipole and in particular stabilizer chains containing a plurality of dipolar groups may be made by random copolymerization methods using dipol-containing co-monomers as described above with reference to methods of introducing such groups into the disperse polymer.

Where solvatable polymeric chain-like component is made by condensation reactions this may be, for example, a self polyester of 12-hydroxy stearic acid of molecular weight about 3,000, this being reacted with propane sultone to introduce a terminal sulphonic acid group. A similar stabilizer containing two strongly polar groups per molecule can be made by condensing adipic acid with an excess of 1,12-dodecane diol to produce a linear polyester of molecular weight about 5,000, the terminal hydroxyl groups being reacted with sulphur trioxide/pyridine complex to convert them to sulphonic acid groups.

A solvatable condensation polymer chain containing a plurality of polar groups may be made by condensing a mixture of maleic anhydride and succinic anhydride (molar ratio 1:4) with dodecane diol, the polymer then being treated with sodium hydrogen sulphite to introduce sulphonic groups.

Where the stabilizer contains a plurality of solvated components and polar groups distributed along a polymeric backbone the backbone may be made by condensation reaction, specific polar interaction or preferably addition polymerization.

A backbone provided with both the chain-like components and the polar groups required for the protolytic reaction with the disperse polymer particles can be made by copolymerizing a mixture of ethylenically unsaturated monomers of which one monomer contains the chain-like component and another contains the polar group.

For example, a solvatable polymeric chain-like component having a terminal unsaturated group suitable for copolymerization with a monomer containing the polar group may be made by the method described in the above-mentioned Patent. Suitable monomers containing the reactive group are exemplified above. Alternatively, a monomer containing both polar group and solvated component can be used, e.g., mono-octadecyl itaconate, optionally with a monomer devoid of such reactive group and solvated component, e.g., styrene.

In another method, the solvated components and/or the polar groups may be attached after the backbone has been formed. This attachment may be made by a wide variety of reactions such as:

| the reaction of carboxyl | group with hydroxyl group. |
|---|---|
| "anhydride | "      "      " |
| "isocyanate | "      "      " |
| "epoxide | "      "      " |
| "ester | "      "      " |
| "amide | "      "      " |
| "isocyanate | " carboxyl " |
| "ester | "      "      " |
| "carboxyl | " amine " |
| "ester | "      "      " |
| "ethylenically unsaturated | "      "      " |
| "isocyanate | "      "      " |
| "anhydride | "      "      " |
| "amide | "      "      " |
| "epoxide | "      "      " |
| "acid | "      "      " |
| "hydroxyl | " methylol " |
| "amide | "      "      " |

One method which is particularly suitable when the polar group is also one which can take part in a condensation reaction, e.g., —COOH, is to form a polymeric backbone having attached to it polar groups in excess of the proportion required for the protolytic reaction and then, by a condensation reaction, attach solvated chain-like components to a proportion of these groups. For example, a polymeric backbone carrying carboxyl groups may be made by polymerization of an unsaturated acid such as methacrylic, itaconic or maleic acid optionally with another monomer such as an acrylic or methacrylic ester or a vinyl benzene, the solvated chain-like components then being attached by reacting a proportion of the carboxyl groups with a high alkyl, e.g., a $C_{18}$, amine or alcohol the long chain of which is solvatable by the organic liquid of the dispersion. Alternatively, the polymeric backbone may contain acid anhydride groups, e.g., by copolymerization of maleic or itaconic acid anhydride, the solvated component being attached by reacting high alkyl, e.g., $C_{18}$, alcohol or amine, with the anhydride groups.

As another alternative, the solvated chain-like component may be provided by reacting with groups on the backbone a suitable solvated addition polymer having a terminal reactive group, e.g., an epoxy- or amine-terminated polylauryl methacrylate polymer produced by the method of the above-mentioned Patent Application. Alternatively, solvatable condensation polymers such as self polyesters of hydroxy acids may be reacted with groups on the backbone.

Another method as described above is to use the backbone a co-monomer which can be reacted with another compound to introduce the desired acidic or basic polar groups.

On the other hand, the polar groups necessary for the protolytic reaction may be attached to a polymeric backbone carrying the solvated chain-like constituents. For example, styrene copolymerized in the backbone can be sulphonated to provide a stabilizer containing sulphonic groups.

Provided the backbone is capable of accommodating a sufficient number of solvated chain-like components and specific interacting polar groups, it may be made by condensation polymerization reaction. Thus, suitable polymeric backbones are the condensation products of polycarboxylic acids with polyols; polycarboxylic acids with polyamines; caprolactam condensates of the nylon 6 type; polyester amides; polyurethanes comprising the reaction products of polyisocyanates with polyols; polyethers; polyesters; epoxide resins; polyamides; polyureas; polysulphides; polysulphones; polyoxymethylenes. Yet another suitable backbone may be formed from ionic polymers such as nylon 66 salt. It is, however, understood that the stabilizers derived from such backbones must remain soluble in the non-aqueous medium.

By selecting appropriate monomers or comers of the backbone may be made by condensation processes which provide the solvated components and polar groups of the stabilizer at the same time. For example, glycidyl stearate reacted with phthalic anhydride will produce a linear condensation polymer chain carrying polar groups (ester carbonyl) in the chain and solvatable $C_{18}$ components attached to the chain. If desired stronger polar groups may be provided on the backbone by using 4-nitro phthalic anhydride or 4-cyano phthalic anhydride in place of the phthalic anhydride. Alternatively, the solvatable components and/or polar groups may be attached to a condensation polymer backbone by methods analogous to those described above.

The stabilizer backbone itself may be formed by specific polar interaction. When a substance such as magnesium stearate, which contains one polar group and one solvatable chain-like component, is solvated by a non-polar non-aqueous liquid, it can be shown by calculation of the associated molecular weight from freezing point depression measurements, that the magnesium stearate molecules associate by specific polar interaction into chains. Sufficient polar forces remain at the polar sites along the backbone to interact with matching polar groups in the dispersed polymer. This provides a simple and effective means of forming a stabilizer bearing a plurality of polar groups and a plurality of solvatable chain-like components. Similar associations occur with mono-alkyl phosphates; of the two residual hydroxyl groups in the molecule, one associates with hydroxyls in other molecules to form a structure which carrier a plurality of polar groups (the remaining hydroxyl groups) and a plurality of solvated chain-like components (the alkyl groups).

Where the polymer particles are preformed in an aqueous phase the dispersions of polymer in organic liquid may also be made by "flushing" preformed particles of polar group-containing polymer into the organic liquid from the aqueous phase. In this case the organic liquid must be immiscible with water. Ionically stabilized polymer particles may be "flushed" from an aqueous phase in which they have been stably dispersed by displacement of the water-soluble counter-ion by a compound containing a similar counter-ion but which is soluble in the organic liquid to which the particles are to be transferred.

Alternatively, the polar group-containing polymer particles if formed in aqueous dispersion may be dried, e.g., by spray drying or tray drying or by coagulation followed by filtration and drying, and then re-dispersed in organic liquid containing a suitable stabilizer. In such cases, the drying must not, of course, cause sintering of the particles.

In aqueous dispersions the polar groups may be associated with or neutralized by counter-ions which may be objectionable in the organic dispersion. For example, metallic counter-ions, if carried over into the organic liquid dispersion, may induce water-sensitivity in films of polymer prepared from the dispersion or may interfere with the desired specific reaction by which the stabilizer is to be attached to the particles in the organic liquid. The amount of such counter-ions carried over can be reduced by modification of the aqueous dispersion, e.g., by acidication or basification or displacement by a suitable volatile counter-ion, such as a water-soluble amine or ammonia, in which case undesired counter-ions may be removed with the aqueous phase. Preferably this modification results in replacement of the counter-ion by the stabilizer for the organic dispersion. For example, the sodium salt of a sulphonic acid used to stabilize the dispersion in the aqueous phase may be convered to the salt of a long chain fatty amine, the long chain of which will be solvated by non-polar organic liquids.

Alternatively use may be made of the ionic pairs which occur in polymer particles which have been dried without such modification. Such ionic pairs arise, for example, in metal salts and Zwitter ions, e.g., those in sulpho-betaines. The dipole occurring in such ionic pairs may be used to attach, by specific interaction, a stabilizer containing an ionic pair and a chain solvatable by the organic liquid in which the dried particles are to be dispersed. A similar interaction may take place between an ionic pair in the polymer and a strong acid or basic group in the stabilizer, e.g., sulphonic or amine groups.

As is earlier explained, stabilization of the particle in the organic liquid is achieved by providing around the particles a barrier of solvated component which sterically stabilizes the particles, this solvated component being attached to the particles by the specific interaction between polar groups in the polymer and complementary polar groups in the stabilizer.

When preformed polymer particles are to be stabilized in organic liquids the stabilizer does not necessarily have to be polymeric and the solvatable chain can be as short as 12 A (e.g., 12 carbon atoms) in length, e.g., alkyl chains, such as dodecyl and octadecyl and corresponding alkenyl chains or equivalent solvatable chains containing heteroatoms, e.g., O as ether links. The basic requirement is till that the stabilizing steric barrier by at least 12 A thick, but this can be provided by relatively simple stabilizers which comprise a suitable polar group and a molecular chain which is solvatable by the organic liquid and which in that condition can extend a distance of at least 12 A from the polar group. In order to provide an adequate steric barrier very short chains will need to be more closely spaced than longer chains with a resultant need for a higher frequency of polar groups on the surface of the polymer particles.

In general, it is preferably to use stabilizer having solvated chains of at least 1,000 and preferably not more than 3,000. Preferably, the total molecular weight of polymeric solvatable chains in the stabilizer molecule is 10,000 to 100,000 (viscosity average).

A feature of this invention is that the proportion of polymer can be in the range of 25 to 65 percent by weight of the dispersion and even higher. Proportions of 25 percent and higher are particularly useful when the dispersions are to be used in coating compositions.

As will be apparent from carrying out the previously described test of heat of interaction at different temperatures, the determined value tends to decrease with increasing temperature. Stabilization of disperse particles should not, therefore, be attempted at temperatures above 200° C. otherwise the strength of the bond between stabilizer and disperse particles may not be adequate. Preferably stabilization is carried out at a temperature not greater than 100°C. and in dispersion polymerization in the presence of stabilizer it is conveniently carried out under reflux in a liquid which refluxes at a temperature not greater than this.

The resulting dispersions are particularly useful in various uses, such as coating compositions, adhesives, spray-dried polymer powder, etc. when the liquid in which the polymer is dispersed is ultimately to be evaporated.

The amount of stabilizer required in the dispersion will vary with the size of the disperse particles; the smaller the particle size, the more surface area is presented for stabilization and, therefore, the higher the usage of stabilizer. In general, the proportion of stabilizer required is in the range 0.1 to 25 percent by weight of the disperse polymer, from 5–10% being suitable, for example, for particles of about $0.1\mu$ in size and from 0.5–2 percent being suitable, for example, for particles of about $1\mu$ in size.

The invention is illustrated by the following Examples in which all parts are by weight.

EXAMPLE 1

A mixture of 19.6 parts of methyl methacrylate, 0.4 part dimethyl amino ethyl methacrylate, 150 parts aliphatic hydrocarbon (boiling point 60°–80° C.), 50 parts aliphatic hydrocarbon (boiling point 150°–170° C.), 10 parts of octadecyl dihydrogen phosphate and 0.5 part of azodiisobutyronitrile, was refluxed for 20 minutes. A fine, stable particulate dispersion of polymethyl methacrylate/dimethyl amino ethyl methacrylate was formed. To this refluxing mixture was added a mixture of 176.4 parts methyl methacrylate, 3.6 parts of dimethyl amino ethyl methacrylate and 0.4 part of azodiisobutyronitrile over a period of 1½ hours, in such a manner that the feed was well diluted by the reflux return. Refluxing was continued for one-half hour longer. A 40 percent solids dispersion of polymethyl methacrylate/dimethyl ethyl methacrylate in fine particles about $0.2\mu$ diameter was thus obtained, the amino groups of the disperse polymer being interacted with the acid groups of the associated phosphate and the particles being stabilized by the solvated octadecyl chains of the phosphate thereby attached.

EXAMPLE 2

Similar polymer dispersions were obtained when the octadecyl acid phosphate of Example 1 was replaced by octadecene-9-yl dihydrogen phosphate.

EXAMPLE 3

Similar polymer dispersions were obtained when the octadecyl acid phosphate of Example 1 was replaced by commercial lauryl acid phosphate.

EXAMPLE 4

A mixture of 98 parts of methyl methacrylate, 2 parts of 4-vinyl pyridine, 5 parts commercial stearyl acid phosphate, 2 parts azodiisobutyrontrile and 400 parts of aliphatic hydrocarbon (boiling point 80°–100° C.) was refluxed for 2 hours. A fine particle dispersion of polymethyl methacrylate/4-vinyl pyridine was produced.

EXAMPLE 5

A mixture of 226 parts of octadecyl methacrylate, 174 parts of methacrylic acid, 2 parts of azodiisobutyronitrile, 12 parts of octyl mercaptan and 100 parts of xylene was added over 4 hours to refluxing butanol, 350 parts. Refluxing was continued for 4 hours more. A 42 percent solids copolymer solution was obtained. This was diluted with butanol to give a 33 percent solids copolymer solution. The solution contained a stabilizer material of molecular weight about 30,000 pendent from which are a plurality of $C_{18}$ chains and a plurality of COOH groups.

A mixture of 74.4 parts of the copolymer solution, 21.4 parts of methyl methacrylate, 0.44 part dimethyl amino ethyl methacrylate, 365.2 parts of aliphatic hydrocarbon (boiling point 60°–80° C.), 47.7 parts of aliphatic hydrocarbon (boiling point 180°–200° C.) and 1 part of azodiisobutyronitrile was refluxed for 20 minutes. A fine particle dispersion was formed. To this was added 3.2 parts of a 10 percent solution of octyl mercaptan in aliphatic hydrocarbon (boiling point 60°–80° C.) all at once; followed by a mixture of 469 parts methyl methacrylate, 9.56 parts dimethyl amino ethyl methacrylate, 7.2 parts of a 10 percent solution of octyl mercaptan in aliphatic hydrocarbon (boiling point 60°–80° C.) and 1 part azodiisobutyronitrile added over 3 hours in such a manner that the feed was well diluted with the reflux return. Refluxing was continued for 2 hours more. A 50 percent solids dispersion of polymethyl methacrylate/dimethyl amino ethyl methacrylate in fine particles of about 0.2 diameter was formed, amine groups of the disperse polymer being interacted with carboxyl groups in the stabilizer.

Similar dispersions were produced when the dimethyl amino ethyl methacrylate was replaced by 4-vinyl pyridine.

EXAMPLE 6

Example 5 was repeated increasing the 226 parts of octa-decyl methacrylate to 286 parts and replacing the methacrylic acid by 196 parts of dimethyl amino ethyl methacrylate in the preparation of the stabilizer copolymer solution and replacing the dimethyl amino ethyl methacrylate by methacrylic acid in the preparation of the disperse polymer. A similar dispersion was produced.

EXAMPLE 7

The condensate of glycidyl methacrylate with carboxyl terminated polylauryl methacrylate, of number average molecular weight 10,000, prepared by the method described in Example 1 of the Patent referred to hereinbefore was copolymerized with butyl methacrylate and vinyl pyridine in the ratio 50:45:5 to produce a branched soluble copolymer of molecular weight about 50,000. The polymer was reacted with dimethyl sulphate and then with sodium hydroxide and the product was isolated as the quaternary ammonium hydroxide, the basic polar groups being attached to one of the solvated chains of the copolymer.

A mixture of 100 parts of the copolymer containing quaternary ammonium hydroxide groups, 98 parts methyl methacrylate, 2 parts methacrylic acid, 2,000 parts of aliphatic hydrocarbon (boiling point 60°–80° C.), 500 parts of aliphatic hydrocarbon (boiling point 150°–170° C.), and 3 parts of azodiisobutyronitrile, was refluxed for 20 minutes. A mixture of 18 parts methacrylic acid, 884 parts methyl methacrylate, and 3 parts of azodiisobutyronitrile was then added in 3 hours via the reflux return so that the feed was well diluted before reaching the reaction zone. Refluxing was continued for 2 hours longer.

A fine, stable dispersion was produced, the stabilizer being bonded to the disperse particles by interaction of the quaternary basic groups with carboxyl groups.

EXAMPLE 8

A polymer of 12-hydroxy stearic acid of molecular weight about 1000 condensed with glycidyl methacrylate to introduce a polymerizable double bond was copolymerized with butyl acrylate and vinyl dimethyl phosphate in the ratio 50:25:25. The molecular weight of the copolymer was about 60,000.

A mixture of 100 parts of this copolymer, 50 parts methyl methacrylate, 50 parts acrylonitrile, 500 parts aliphatic hydrocarbon (boiling point 150°– 170° C.), 500 parts of benzene, 1500 parts of aliphatic hydrocarbon (boiling point 60°– 80° C.) and 3 parts of azodiisobutyronitrile was refluxed for 30 minutes. A mixture of 450 parts methyl methacrylate, 450 parts acrylonitrile and 3 parts of azodiisobutyronitrile was then added in 3 hours via the reflux return so that the feed was well diluted before reaching the reaction zone. Refluxing was continued for 1 hour more.

A fine, stable dispersion was obtained, the stabilizer being bonded to the disperse particles primarily by interaction between the polar phosphate ester groups in the stabilizer and the dipolar nitrile groups in the disperse polymer.

EXAMPLE 9

The condensate of poly-12-hydroxy stearic acid with glycidyl methacrylate as used in Example 8 was copolymerized with butyl acrylate and vinyl pyridine in the ratio 50:40:10. The copolymer which had a molecular weight of about 40,000 was then reacted with methyl bromide to produce the quaternary ammonium salt.

A fine, stable dispersion was formed when the disperseion polymerization of Example 8 was carried out using the solution of copolymer containing quaternary ammonium salt in place of the copolymer solution of Example 8.

EXAMPLE 10

120 parts of maleic anhydride and 130 parts of styrene, 5 parts of azodiisobutyronitrile, 2.5 parts of t-dodecyl mercaptan solution (10 percent), 250 parts of butyl acetate and 100 parts of acetone were added continuously for 2 hours to 150 parts of toluene and 350 parts of butyl acetate at reflux temperature. The mixture was heated for one hour. To the resulting solution of polymer (molecular weight 10,000) was added 800 parts of commercial dioctadecyl amine. This mixture was heated at 120° C. for one hour to react the amine with the carboxylic anhydride groups.

12 parts of the stabilizer solution above, 36.4 parts of methyl methacrylate, one part of tertiary butyl amino ethyl methacrylate, 0.5 part of azodiisobutyronitrile, 80 parts of aliphatic hydrocarbon (boiling range 60°– 80° C.) and 20 parts aliphatic hydrocarbon (boiling range 150°– 200° C.) were raised to reflux and held for 15 minutes. Then a mixture of 62 parts of methyl methacrylate, 2 parts of tertiary butyl amino ethyl methacrylate and 0.7 part of azodiisobutyronitrile were fed, diluted by the returning reflux stream over 3 hours.

A fine particle size dispersion of methyl methacrylate copolymer was obtained, the stabilizer being associated therewith by the interaction of its carboxyl groups with the amine groups of the disperse polymer, and the particles being stabilized by the solvated steric barrier provided by the $C_{18}$– $C_{16}$ alkyl chains.

EXAMPLE 11

Similar results to those of Example 10 were also obtained using a stabilizer made by esterifying an octadecene-1/maleic anhydride copolymer of molecular weight about 20,000 with hexadecanol to form half-esters with the anhydride groups. In this case the disperse polymer was a random copolymer of methyl methacrylate/dimethylamino ethyl methacrylate (weight ratio 100/3). In a further dispersion polymerization of this copolymer, a stabilizer made by half-esterifying a copolymer of tetradecene-1/maleic anhydride with dodecanol also produced a stable dispersion.

EXAMPLE 12

A copolymer of octadecene-1 and maleic anhydride (molar ratio 1:1 and molecular weight about 20,000) was used as a stabilizer in the dispersion polymerization of methyl methacrylate and acrylonitrile (weight ratio 1:1) in aliphatic hydrocarbon by a process generally as described in Example 8. A stable dispersion of polymer particles was obtained, the stabilizer being associated with the disperse particles by interaction between the anhydride groups of the stabilizer and the nitrile and ester groups in the disperse polymer, the steric barrier being provided by the solvated octadecene chains.

EXAMPLE 13

A stabilizer as used in the preceding Example was also used to stabilize disperse particles made by polymerizing in an aliphatic hydrocarbon containing the stabilizer, a mixture of methyl methacrylate and methacrylic acid (weight ratio 100:4) by a process generally as described in Example 7. In this case the interaction is between the anhydride groups of the stabilizer and the carboxyl and ester groups in the disperse polymer.

EXAMPLE 14

A copolymer of octadecene-1 and maleic anhydride of molecular weight about 25,000 was half-esterified with a 1:1 molar mixture of hexadecanol and a methoxy polyethylene glycol (molecular weight 325). The product was successfully used as a stabilizer in a dispersion polymerization in aliphatic hydrocarbon of methyl methacrylate and dimethylamino ethyl methacrylate (weight ratio 100:3) by a process generally as described in Example 7.

EXAMPLE 15

The alternating copolymer of the preceding Example was reacted with a condensation product of nonyl phenol and ethylene oxide (molar ratio 1:9). The product was successfully used as a stabilizer in a dispersion polymerization in aliphatic hydrocarbon of methyl methacrylate and acrylonitrile (weight ratio 1:1) by a process generally as described in Example 8.

EXAMPLE 16

A copolymer of molecular weight about 40,000 was made by polymerizing in solution in a mixture of β-ethoxy ethyl acetate and ethyl acetate (1:4 by weight) a mixture of stearyl methacrylate, polyethylene glycol methacrylate and butyl methacrylate (molar ratio 5:5:1 respectively). The polyethylene glycol had a molecular weight of 325. The product was successfully used as a stabilizer in a dispersion polymerization in aliphatic hydrocarbon of methyl methacrylate and acrylonitrile (weight ratio 2:1).

A similar copolymer made by polymerizing a mixture of the same monomers in molar ratios of 2:1:1 respectively was successfully used in a dispersion polymerization in aliphatic hydrocarbon of methyl methacrylate and acrylonitrile (weight ratio 1:2).

EXAMPLE 17

A copolymer of ceto-stearyl methacrylate and dimethyl amino ethyl metharylate (mole ratio 1:1) of molecular weight about 30,000 was treated in solution in a mixture of ethyl acetate and butanol (weight ratio 1:1) with 1.1 mole equivalent of propane sultone. The sultone reacted with amine groups of the copolymer to produce very strongly dipolar sulpho betaine groups. The reacted copolymer (added as the solution) was successfully used as a stabilizer in a dispersion polymerization of methyl methacrylate in aliphatic hydrocarbon.

The interaction bonding the stabilizer to the disperse polymer was between the sulpho betaine groups and ester carbonyl groups of the disperse polymer.

EXAMPLE 18

A random copolymer of lauryl methacrylate and glycidyl methacrylate (weight ratio 97:3) of molecular weight about 35,000 was treated in solution with 98 percent sulphuric acid to produce the sulphate half-ester of the glycidyl groups. The polymer contained on average about six such half-ester groups per molecule.

The polymer was used as a stabilizer in a dispersion polymerization of methyl methacrylate and dimethyl amino ethyl methacrylate (weight ratio 99.8:0.2) in aliphatic hydrocarbon. A fine, stable dispersion was obtained, the sulphate half-ester groups in the stabilizer being interacted with amine groups in the disperse polymer.

EXAMPLE 19

A similar result to that of Example 18 was obtained when the random copolymer was treated with phosphoric acid to introduce an average of about six hydrogen phosphate groups per molecule, this treated copolymer then being used in the dispersion polymerization.

EXAMPLE 20

A mixture of 224 parts of dioctadecylamine, 78 parts of a copolymer of maleic anhydride and vinyl methyl ether (mole ratio 1:1 $\eta_{sp}$ 0.1 in butanone-2 at 23° C.) and 300 parts of butanone-2 was warmed to 50° C. At this temperature an exothermic reaction occurred. When the reaction subsided heating was continued and the mixture was refluxed at 80° C. for 15 minutes. While still hot the mixture was diluted with 300 parts of aliphatic hydrocarbon (boiling range 80°–100° C.).

150 parts of this solution were used as the source of stabilizer in a dispersion polymerization as described in Example 5. A fine-particle stable dispersion was obtained, the stabilizer being bonded by its carboxyl groups to amine groups in the disperse polymer.

A similar stabilizer was produced by refluxing a mixture of 93.3 parts cetyl alcohol, 62 parts of the copolymer of maleic anhydride/vinyl methyl ether and 400 parts butanone-2 for 12 hours. This was successfully used in a similar dispersion polymerization process.

EXAMPLE 21

Stearic acid was reacted with a slight excess of glycidyl methacrylate and the product was copolymerized with methyl methacrylate in a weight ratio of 1:1 to produce a copolymer of molecular weight about 20,000. This comprised an acrylic backbone with attached $C_{18}$ solvated components and at the point of attachment of each component a hydroxyl group.

The copolymer was used as a stabilizer in a dispersion polymerization of methyl methacrylate in aliphatic hydrocarbon to give a stable coarse particle dispersion of about 30 percent polymer content. Bonding of the stabilizer was by interaction of hydroxyl groups and ester carbonyl groups but because of the relatively weak interaction only a minor proportion of the hydroxyl groups was interacted.

EXAMPLE 22

A copolymer of stearyl methacrylate and glycidyl methacrylate (weight ratio 2:1 molecular weight about 20,000) was reacted with a molar equivalent (with respect to the epoxide groups) of acetic acid. There was thus produced an acrylic polymer chain carrying a plurality of $C_{18}$ solvatable components and a plurality of hydroxyl groups. This could be used as a stabilizer for a methyl methacrylate dispersion polymerization in aliphatic hydrocarbon.

EXAMPLE 23

A mixture of vinyl toluene and vinyl sulphonic acid (weight ratio 98:2) was copolymerized in solution in a toluene/butanol mixture (weight ratio 1:1) to a molecular weight of about 30,000. The resulting polymer was soluble in a benzene/toluene mixture (weight ratio 1:1) and contained highly polar sulphonic acid groups spaced on average about 100 A apart along the polymer chain.

The copolymer was used as a stabilizer in a dispersion polymerization of acrylonitrile and dimethyl amino ethyl methacrylate (weight ratio 98:2) in benzene/toluene (1:1). A stable dispersion of polymer was produced, the stabilizer being bonded to the disperse polymer by interaction of the sulphonic acid groups and amine groups.

EXAMPLE 24

The stabilizer of Example 6 was used in a dispersion polymerization of vinyl acetate/acrylic acid (weight ratio 98:2) in aliphatic hydrocarbon following the general polymerization procedure described in Example 5. A stable dispersion of about 50% solids was produced.

EXAMPLE 25

A mixture of 263 parts stearyl methacrylate, 127 parts acrylonitrile, 12.9 parts octyl mercaptan, and 1.19 parts of azodiisobutyronitrile was added over a period of three hours to a refluxing mixture of 400 parts benzene and 200 parts ethyl acetate. Reflux was continued for a further 2 hours. After cooling, the copolymer was precipitated by pouring the resulting solution into 10 times its volume of methanol. The copolymer, which was a white waxy solid, had a molecular weight of about 20,000 and on average contained one solvatable $C_{18}$ component to two polar nitrile groups.

A mixture of 260 parts of hexane, 90 parts cyclohexane, 90 parts aliphatic hydrocarbon (boiling point 180°– 200° C.), 27 parts acrylonitrile, 2.7 parts of the above copolymer and 5.4 parts of azodiisobutyronitrile was refluxed for 10 minutes. A mixture of 165 parts acrylonitrile, 33 parts of the above copolymer, 1.32 parts azodiisobutyronitrile, 0.42 part octyl mercaptan and 50 parts cyclohexane was added over a period of 1½ hours to the returning reflux stream. The mixture was refluxed for a further half hour. A fine particle dispersion of polyacrylonitrile was obtained, the stabilizer being bonded to the disperse particles by nitrile/nitrile interaction.

EXAMPLE 26

3 parts of sodium metal were reacted with 30 parts of caprolactam dissolved in 250 parts of toluene. 35 parts of this solution, 20 parts of caprolactam, 60 parts of toluene and 2 parts of the copolymer described in Example 25 were refluxed for 8 hours.

A stable, fine-particle dispersion of polycaprolactam was obtained. The stabilizing copolymer was bonded to the disperse particles by interaction of nitrile groups in the copolymer with amide groups in the disperse polymer.

EXAMPLE 27

A solution of 5 parts of a copolymer of methyl methacrylate and dimethyl amino ethyl methacrylate (weight ratio 98:2, molecular weight 40,000) in 50 parts of toluene was added slowly to a well-stirred solution of 0.6 part of a copolymer of stearyl methacrylate and methacrylic acid (made as described in Example 5) in 500 parts of aliphatic hydrocarbon (boiling range 130°– 150° C.) at 80°– 90° C.

The product was a fairly coarse but stable dispersion.

EXAMPLE 28

A polyamide was made by reacting in a 1:1 mixture of benzene and dimethyl formamide at 40 C. a mixture of equimolecular weights of pyromellitic anhydride and a di-secondary amine produced by reducing the nitrile of dimerised drying oil fatty acid in the presence of methyl amine. The resulting polymer was then mixed at room temperature with a slight excess of commercial dioctadecylamine to form the salt of the free carboxyl groups.

The product was used as a stabilizer in a dispersion polymerization of methyl methacrylate and acrylonitrile (weight ratio 1:1) by a process generally as described in Example 8. A fine-particle stable dispersion was obtained, the stabilizer/disperse polymer interaction being one between amide groups and nitrile groups.

EXAMPLE 29

300 parts of a 3 percent solution of a copolymer of stearyl methacrylate and dimethylaminoethyl methacrylate (prepared as in Example 6) in white spirit (a mixture of aliphatic hydrocarbon and a minor proportion of aromatic hydrocarbon having a boiling range from 150°– 200° C.) was mixed with 300 parts of a 50 percent dispersion of polyvinyl chloride in water (prepared by a typical emulsion polymerization technique using ammonium persulphate as initiator and sulphonated castor oil, e.g., Calsolene oil, as surfactant). The mixture was stirred and heated to 45° C. 45 parts of sodium chloride were added and sufficient dilute aqueous hydrochloric acid to bring the pH of the mixture to 2. The mixture was then filtered through cotton lint to remove "bits." The filtrate, on standing, separated into a clear aqueous layer and layer of white spirit containing stably dispersed particles of polyvinyl chloride. The lower clear aqueous layer was discarded and the dispersion of polyvinyl chloride in white spirit was dried by adding 100 parts of hexane, azeotroping and finally distilling of the hexane.

EXAMPLE 30

A solution of 100 parts of a 1 percent solution of a copolymer of stearyl methacrylate and dimethyl aminoethyl methacrylate in white spirit (as in Example 29) was mixed with 100 parts of a 10 percent dispersion of polymethyl methacrylate in water (prepared using ammonium persulphate as initiator). The mixture was stirred and heated to 45° C. 10 parts of sodium chloride were added and the mixture filtered through cotton lint. The lower aqueous layer which separated was discarded to leave a dispersion of polymethyl methacrylate in white spirit. This was then dried as in Example 29 but using an aliphatic hydrocarbon with a boiling range 70°– 85° C. in place of hexane.

EXAMPLE 31

The polyvinyl chloride aqueous dispersion, described in Example 29, was spray-dried. 100 parts of the dry powder and 65 parts of a 7.5 percent solution of the acrylic copolymer described in Example 29 in white spirit were ball-milled for 18 hours. The resulting polymer dispersion had a viscosity of 0.6 poise.

EXAMPLE 32

The polyvinyl chloride aqueous dispersion described in Example 29 was acidified by treating with an ion exchange resin and tray dried. 100 parts of the dry powder and 70 parts of a 7.5 percent solution of the acrylic copolymer described in Example 29 in white spirit were ball-milled for 18 hours. The resulting polymer dispersion had a viscosity of 0.9 poise.

EXAMPLE 33

100 parts of the dry polymer powder described in Example 32, 100 parts of white spirit and 5 parts of N,N-dimethyl octadecyl-amine were ball-milled for 18 hours. The resulting polymer dispersion was thixotropic, but when sheared had a viscosity of 0.6 poise.

EXAMPLE 34

100 parts of the dry polymer powder described in Example 31, 100 parts of white spirit and 5 parts of N,N-dimethyl octadecylamine were ball-milled for 18 hours. The resulting polymer dispersion had a viscosity of 0.25 poise.

EXAMPLE 35

A stabilizer for use in polar organic liquids was prepared by copolymerizing methyl methacrylate, ethyl acrylate and dimethyl aminoethyl methacrylate (85:10:5) and reacting this at 80°– 100° C. for 1 hour with a mole equivalent of propane sultone.

The stabilizer so-produced was used (in a proportion of 5 percent of the particulate polymer) to disperse polymers listed in column 1 in the organic liquid listed in column 2. All the polymers in column 1 were commercially available particulate polymers, the particles carrying polar groups derived from the surfactant used in their preparation in aqueous media:

| (1) | (2) |
|---|---|
| a. Polyvinyl fluoride | Isophorone |
| b. Polythene | Butyl acetate |
| c. Polyvinylidene fluoride | β-ethoxyethyl methacrylate |
| d. Polyvinylidene fluoride | Isophorone |

EXAMPLE 36

A stabilizer for use in moderately polar organic liquids was prepared by copolymerizing β-ethoxyethyl methacrylate, ethyl acrylate and dimethylamino ethyl methacrylate (85:10:5) and reacting this as in Example 35 with propane sultone. This stabilizer was used to make high solids fluid dispersions of particulate polyvinyl chloride in diisodecyl phthalate. Again, the polymer was a commercially available particulate polymer, the particles carrying polar groups derived from the surfactant used in their preparation in aqueous media.

EXAMPLE 37

100 parts of a commercially available polyvinyl chloride powder (the particles of which carried polar groups derived from the surfactant used in their preparation in aqueous media) were ball-milled for 18 hours with a solution of 5 parts of dispersant in 55 parts of aliphatic hydrocarbon (boiling range 170°– 210° C.). The following stabilizers gave fluid dispersions.

a. Copolymer of lauryl methacrylate:dimethylaminoethyl methacrylate (97:3) reacted with propane sultone.
b. Copolymer of lauryl methacrylate:dimethylaminoethyl methacrylate (97:3) reacted with ethyl bromide.
c. Copolymer of lauryl methacrylate:dimethylaminoethyl methacrylate (97:3) reacted with dimethyl sulphate.
d. Copolymer of lauryl methacrylate:dimethylaminoethyl methacrylate (97:3).
e. Copolymer of stearyl methacrylate:dimethylaminoethyl methacrylate (50:50).
f. Copolymer of stearyl methacrylate:ethyl acrylate:dimethylaminoethyl methacrylate (50:45:5).
g. Copolymer of stearyl methacrylate:methyl methacrylate:dimethylaminoethyl methacrylate (50:45:5).
h. Copolymer of stearyl methacrylate:ethyl acrylate:dimethylaminoethyl methacrylate (50.45:5) reacted with propane sultone.
i. Copolymer of stearyl methacrylate:methyl methacrylate:dimethylaminoethyl methacrylate (50:45:5) reacted with propane sultone.
j. Copolymer of poly-12-hydroxystearic acid ($\overline{M}_N$ = 1,800) reacted with glycidyl methacrylate:ethyl acrylate:dimethylaminoethyl methacrylate (50:45:5) reacted with propane sultone.
k. Copolymer of (j) reacted with dimethyl sulphate.
l. Poly-12-hydroxy stearic acid ($\overline{M}_N$ = 1,800) condensed with dimethylamino ethanol (mole for mole) and then reacted with a mole equivalent of propane sultone.
m. Sodium salt of a copolymer of lauryl methacrylate:methacrylic acid (97:3).
n. Copolymer of lauryl methacrylate:glycidyl methacrylate (97:3) reacted with a mole equivalent of sulphuric acid.
o. Copolymer of lauryl methacrylate:glycidyl methacrylate (97:3) reacted with a mole equivalent of phosphoric acid.
p. Sodium salt of the copolymer in (n).
q. Potassium salt of the copolymer in (o).

Stabilizer (a) was prepared as follows: A mixture of 97 parts of lauryl methacrylate, 3 parts of dimethylaminoethyl methacrylate, and 1.3 parts azodiisobutyronitrile dissolved in 15 parts ethyl acetate was fed over a period of 2 hours to a refluxing mixture of 109.5 parts of aliphatic hydrocarbon (boiling range 100°– 120° C.) and 72.75 parts of aliphatic hydrocarbon (boiling range 70°– 90° C.). Refluxing was continued for a further 12 hours until 33 percent non-volatile content was obtained. 50 parts of the copolymer solution was mixed with 0.4 part propane sultone, heated at reflux temperature for 1 hour, then allowed to cool to room temperature.

This reaction is typical of those used to prepare the random copolymer stabilizers e.g. (a) to (i) and (m) to (q) in the above list.

Stabilizer (j) was prepared as follows:

A mixture of 144 parts ethyl acrylate, 16 parts dimethyl aminoethyl methacrylate, 6.4 parts azodiisobutyronitrile and 320 parts of a self-ester of 12-hydroxy stearic acid ($\overline{M}_N$ = 1,800) reacted with glycidyl methacrylate to provide a terminal copolymerizable unsaturated group was fed over a period of 4 hours into a refluxing mixture of 182.5 parts ethyl acetate and 66 parts butyl acetate. Refluxing was continued for a further 16 hours until 46.5 percent non-volatile content was obtained. 13.25 parts of propane sultone were added to the copolymer solution and heated at reflux temperature for 1 hour.

EXAMPLE 38

The stabilizers of Example 37 may be used to prepare fluid dispersions of a wide range of particulate polymers. Using the stabilizer (j) fluid, high solids dispersions of the following polymer powders in aliphatic hydrocarbon (boiling range 170°– 210° C.) have been prepared.

| Polymer | Polar Group |
|---|---|
| a. Polyvinylidene fluoride | from surfactant |
| b. Polymethyl methacrylate | " "+ ester carbonyl dipole |

| | | |
|---|---|---|
| c. Polyacrylonitrile | " | " +nitrile dipole |
| d. Polystyrene | " | " |
| e. Polyvinyl acetate | " | " +ester carbonyl dipole |
| f. Poly(vinyl chloride/ vinyl acetate/maleic acid) 87:12:1 | " " | " +carboxyl " dipole |
| g. Polyvinyl fluoride | " | " |
| h. Polytetrafluorethylene | " | " |
| i. Polyethylene | from surfactant | |
| j. Nylon | " | " +amide dipoles |
| k. High polymer of ethylene terephthalate | " | " +ester carbonyl dipole |
| l. Chlorinated rubber | " | " |

What is claimed is:

1. A stable dispersion of particles of synthetic polymer in inert organic liquid in which the polymer is insoluble,
the dispersion containing stabilizer which provides around the dispersed polymer particles a stabilizing steric barrier at least 12 A thick
said stabilizer comprising at least one solvated chain-like component and at least one freely orientatable polar group per molecule,
the dispersed polymer also containing at least one polar group per molecule which is in strong specific interaction with the said polar group in said stabilizer,
the bond energy between said polar groups which are in strong specific interaction being at least as great as the bond energy between a carboxylic acid group and a amine group when they are in strong specific interaction in an inert organic liquid ester
the total bond energy of strong specific interaction between said stabilizer molecule and the disperse polymer particles causing the stabilizer to be bonded thereto.

2. A dispersion as claimed in claim 1 in which the stabilizer molecule comprises a solvated polymeric chain carrying at least one polar group interacted with the disperse polymer to bond the stabilizer thereto.

3. A dispersion as claimed in claim 1 in which the stabilizer molecule comprises a plurality of pendent solvated chain-like components attached to a polymeric backbone which has distributed along it a plurality of polar groups interacted with the disperse polymer to bond the stabilizer thereto.

4. A dispersion as claimed in claim 3 in which the stabilizer molecule comprises at least 10 solvated components of length greater than 12 A, but of molecular weight on average less than 1,000, and at least 10 polar groups interacted with complementary polar groups in the disperse polymer, the proportion of solvated components to polar groups being from 1:3 to 3:1.

5. A dispersion as claimed in claim 3 in which the stabilizer molecule comprises at least 10 solvated components of length greater than 16 A, but of molecular weight on average less than 1,000, and at least 10 polar groups interacted with complementary polar groups in the disperse polymer, the proportion of solvated components to polar groups being from 1:3 to 3:1.

6. A dispersion as claimed in claim 1 in which the stabilizer comprises a solvated polymeric chain carrying at least 10 polar groups capable of interacting with polar groups in the polymer with a bond energy of from about that corresponding to the interaction of nitrile groups with nitrile groups in aliphatic hydrocarbon to about that corresponding to the interaction of alkyl hydrogen phosphate groups with amine groups in aliphatic hydrocarbon, the polar groups being distributed along the polymeric chain at an average spacing of at least 50 A.

7. A dispersion as claimed in claim 1 in which the stabilizer comprises a solvated polymeric chain carrying at least 20 polar groups capable of interacting with polar groups in the polymer with a bond energy of from about that corresponding to the interaction of nitrile groups with nitrile groups in aliphatic hydrocarbon to about that corresponding to the interaction of alkyl hydrogen phosphate groups with amine groups in aliphatic hydrocarbon, the polar groups being distributed along the polymeric chain at an average spacing of at least 50 A.

8. A dispersion as claimed in claim 1 in which the stabilizer comprises a solvated polymeric chain carrying from 1 to 10 polar groups capable of interacting with the polar groups in the polymer with a bond energy of above about that corresponding to the interaction of mono- or di-alkyl phosphate groups with amine groups in aliphatic hydrocarbon.

9. A dispersion as claimed in claim 1 in which the interaction between polar groups in the stabilizer and complementary groups in the disperse polymer is a protolytic reaction.

10. A dispersion as claimed in claim 1 in which the interaction between polar groups in the stabilizer and complementary groups in the disperse polymer is a dipole-dipole interaction.

11. A dispersion as claimed in claim 1 containing at least 25 percent by weight of disperse polymer.

12. A dispersion as claimed in claim 1 in which the major part of the liquid is volatile at a temperature not greater than 200° C.

* * * * *